United States Patent [19]

Brown et al.

[11] 4,267,658
[45] May 19, 1981

[54] FISHING LURE SIMULATING FISH BAIT

[76] Inventors: Clarence C. Brown, c/o George Spector, 3615 Woolworth Bldg., 233 Broadway; George Spector, 3615 Woolworth Bldg., 233 Broadway, both of New York, N.Y. 10007

[21] Appl. No.: 834,910

[22] Filed: Sep. 20, 1977

[51] Int. Cl.³ .............................................. A01K 97/02
[52] U.S. Cl. .................................. 43/42.06; 43/44.99
[58] Field of Search ...................... 43/41, 41.2, 42.06, 43/44.99

[56] References Cited

U.S. PATENT DOCUMENTS

| | | | |
|---|---|---|---|
| 2,465,127 | 3/1949 | Stark | 43/41 X |
| 2,532,879 | 12/1950 | Baker | 43/42.06 |
| 2,703,945 | 3/1955 | Johnson | 43/42.06 |
| 2,749,647 | 6/1956 | Beloff | 43/42.06 |
| 3,835,572 | 9/1974 | Mounsey | 43/42.06 |
| 4,138,794 | 2/1979 | Chiodini | 43/44.99 |

Primary Examiner—Nicholas P. Godici

[57] ABSTRACT

A fishing lure designed to attract fish by means of having a smell and taste of natural baits, so that a fisherman may catch more fish; the invention of the present application presenting several different models thereof wherein a basic feature includes a hollow lure body containing a cut or ground up frozen bait of cotton saturated with a combination of liquid fish extracts for salt and fresh water fishing; the hollow body being perforated with openings so that the content can slowly ooze outwardly and into the water around the lure.

1 Claim, 7 Drawing Figures

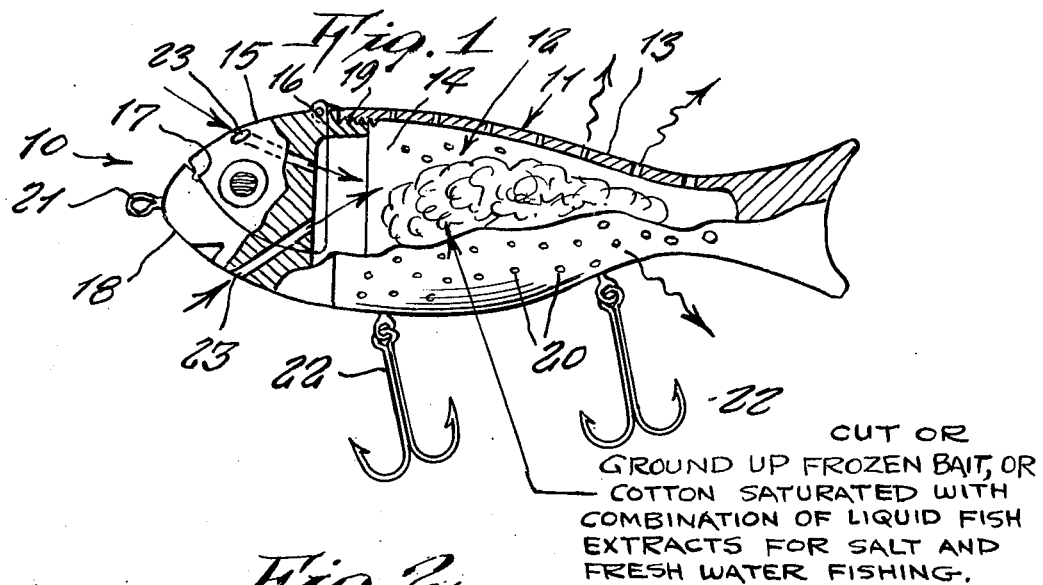
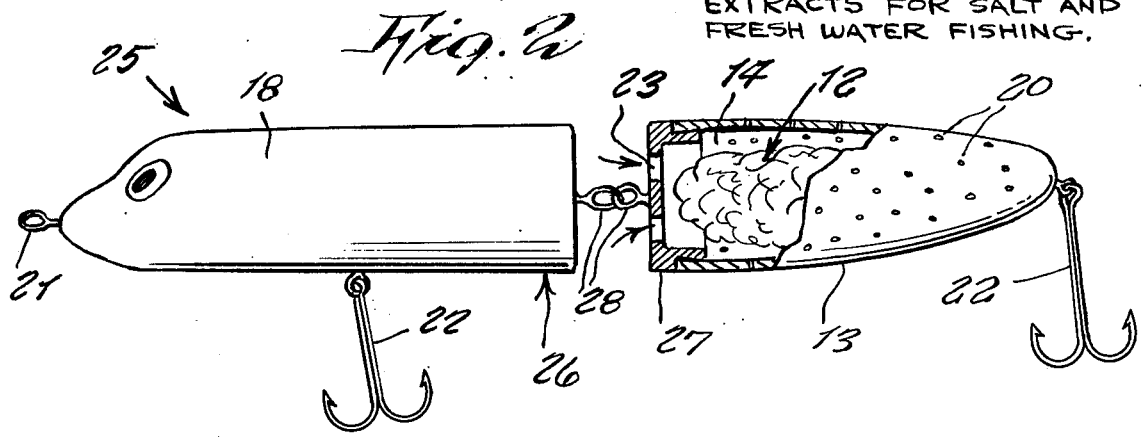
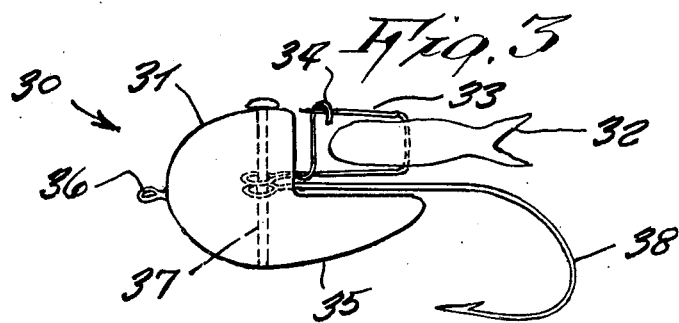
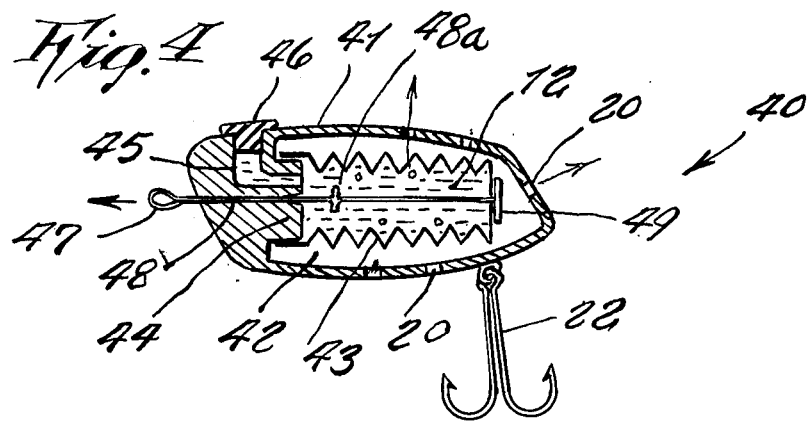

FISHING LURE SIMULATING FISH BAIT

This Invention relates generally to fishing lures.

A principal object of the present invention is to provide a fishing lure that attracts fish by having a smell and taste of natural baits.

Another object is to provide a tasty chum bait which accordingly will increase a fisherman's catch.

Still another object is to provide a tasty chum bait which can be manufactured in any large number of different models in order to be suitable for different kinds of fresh water and also salt water fish.

Othe objects are to provide a tasty chum bait which is simple in design, inexpensive to manufacture, rugged in construction, easy to use and efficient in operation.

These and other objects will be readily evident upon a study of the following specifications and the accompanying drawing wherein:

FIG. 1 is a side view partly in cross section and showing one design of fishing lure incorporating the invention.

FIG. 2 is another design of lure insorporting the invention.

FIG. 3 shows still another lure with the invention, and showing a live minnow attached thereto.

FIG. 4 is a cross sectional view of still another design of lure in which the extract is contained in a bellows that is squeezed each time that the line is jerked so to dispense a small quantity into the water.

Figure 5:
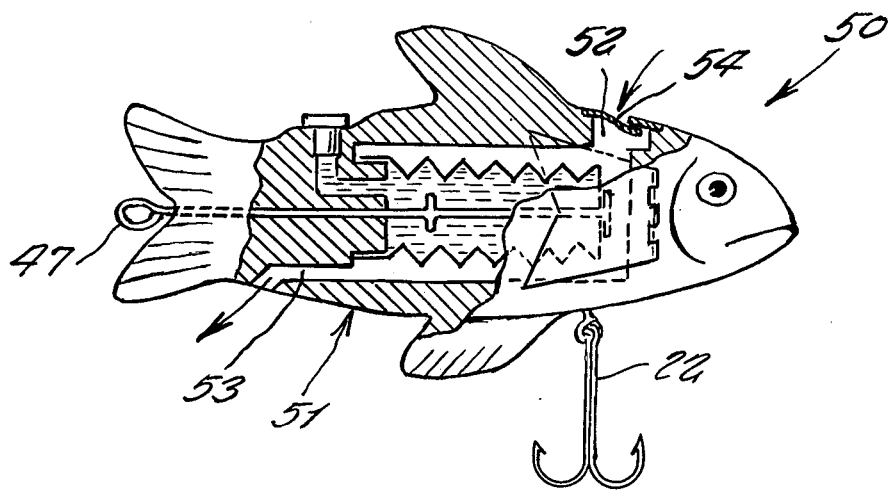
FIG. 5 is a side view partly in cross-section showing another modified design incorporating the principles shown in FIG. 4.

Refering now to the drawing in greater detail, and more particularly to FIG. 1 thereof at this time, the reference numeral 10 represents a tasty chum bait according to the present invention which includes a lure 11 that is refillable with a substance 12 that has an odor and taste which attracts fish.

The lure 11 is shaped and painted on its outer side so to resemble a small fish, and includes a hollow body 13, the interior compartment 14 of which is accessible by a door 15 pivotable about a spring loaded hinge 16 so that is normally remains closed. A detent 17 aids in locking the door.

In FIG. 1 there is also illustrated an alternate construction for gaining access to the compartment 14 in order that it may be refilled with substance 12. This comprises a fish head member 18 that screw threads at 19 on an open end of the body 13.

Still more alternately the lure can include both the door 15 and the screw thread connection as shown, if so prefered by a manufacturer.

The body 13 is perforated with opening 20 so that the substance 12 can ooze out into the water around the lure so fish can smell and taste it.

The lure 11 additionally includes eyelet 21 for attachment to a fishing line, and it also includes triple hooks 22 for catching a fish. Openings 23 at a front of the lure communicate with the compartment 14.

The substance 12 comprises cut up or ground up frozen bait or else a cotton that is saturated with a combination of liquid fish extracts for salt and fresh water fishing.

In use, the lure is pulled by a fishing line so to cause water enter openings 23 into compartment 14 where it mixes with the substance 12 and then out of the openings 20 so that the water around the lure is thus flavored and scented by the substances in order to attract fish to the lure.

In FIG. 2 another design of tasty chum bait 25 includes a lure 26 in which the body has an end cap 27 snapped over its open end, and the cap is connected by interconnected eyelets 28 to the head 18 which thus freely swivels respective to the body 13. The water intake openings 23 extend through the cap. The tasty chum bait 25 includes all the above described features of tasty chum bait 10 such as the substance 12 in compartment 14, the the perforated openings 20, the eyelet 21 and triple hooks 22. The tasty chum bait 25 operates a same as the tasty chum bait 10.

In FIG. 3, a tasty chum bait 30 includes a lure 31 to which a live minnow 32 is attached so to squirm and move in the water for being seen by the fish. The minnow is impaled on a wire pin 33 retained by a kepper 34. The lure incudes a body 35 with line eyelet 36. A rivet 37 holds a fish hook 38 as well as the freely pivotable pin 33.

In FIG. 4, a tasty chum bait 40 includes a body 41 containing compartment 42 in which a squeezable bellows 43 serves to contain the substance 12 in a liquid form. One end of the bellows snaps on a nipple 44 through which a passage 45 extends so to allow refilling the bellows. The passage is closable by an end cap 46. The bellows are perforated with small holes.

An eyelet 47, for attachment to a fishing line, is on an outer end of a rod 48 which extends through the bellows as well as through a forward end of the body. An enlarged head 49 on the rod bears against the end of the bellows, so that in use, when the fishing line is pulled, the rod slides in the lure and squeezes the bellows to squeeze some of the liquid substances out of the bellows which then mixes with water that enters the compartment through the body openings 20 and which passes outwardly into the water around the lure through the openings 20 as the bellows is alternately squeezed and expanded. A stop 48A along the rod abuts against the nipple to limit an amount of squeezing the bellows at each operation and thus limit the amount of substance 12 released at each operation.

In FIG. 5, another design of tasty chum bait 50 is constructed to operate generally similarly to tasty chum bait 40, except that in this design the tasty chum bait 50 has a lure 51 in the shape of a small fish, and the fishing line eyelet extends from a rear end of the lure so to produce the realistic and natural motion of a fish darting forwardly and then retrieving rearwardly after each dart. The lure 51 includes all the mechanism of above described tasty chum bait 40 except that the instead of openings 20, it includes a water intake opening 52 and a water outlet opening 53. The intake opening is fitted with a flap value 54 which automatically opens when the lure moves foreward, and closes down when moving rearward.

Figure 6:
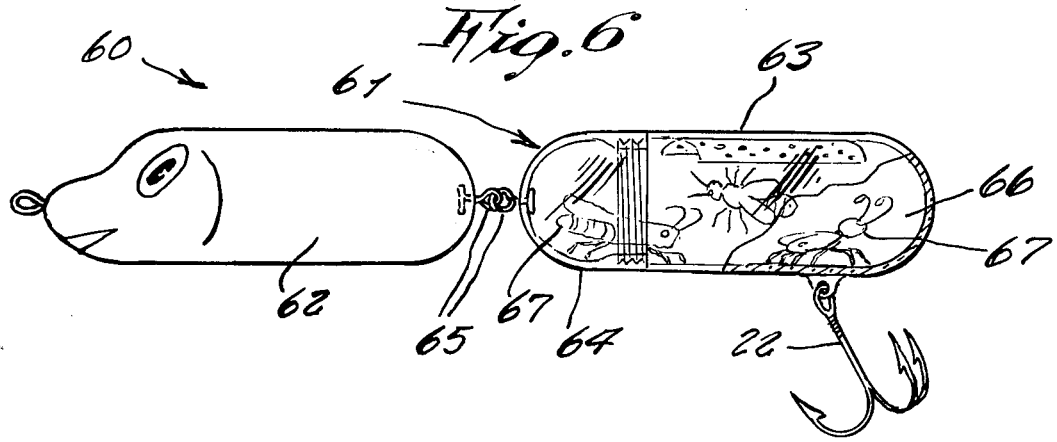
FIG. 6 is a side view partly in cross-section showing still another design employing live bait inside transparent capsule.

In FIG. 6, another design of tasty chum bait 60 includes a lure 61 consisting of a head 62 and transparent body 63 screwed to a transparent end cap 64 which is attached by interconnected eyelets 65 to the head so that the body freely swivels respective to the head. The transparent body and end cap enclose a central compartment 66 in which various bait 67 is placed alive in order to be seen by fish to be moving about inside the compartment. Such bait can include various insects such as grasshoppers, beetles, winged flies or it can include crawling inscet, or swimming water animals. A series of air holes through the body may be covered with a plastic gas screen as shown to control against water entry, while allowing sound waves from the live bait to enter the water for being heard by the fish.

Alternately, it can be partly filled with water in case it additionally includes a water bait such as a minnow.

Figure 7:
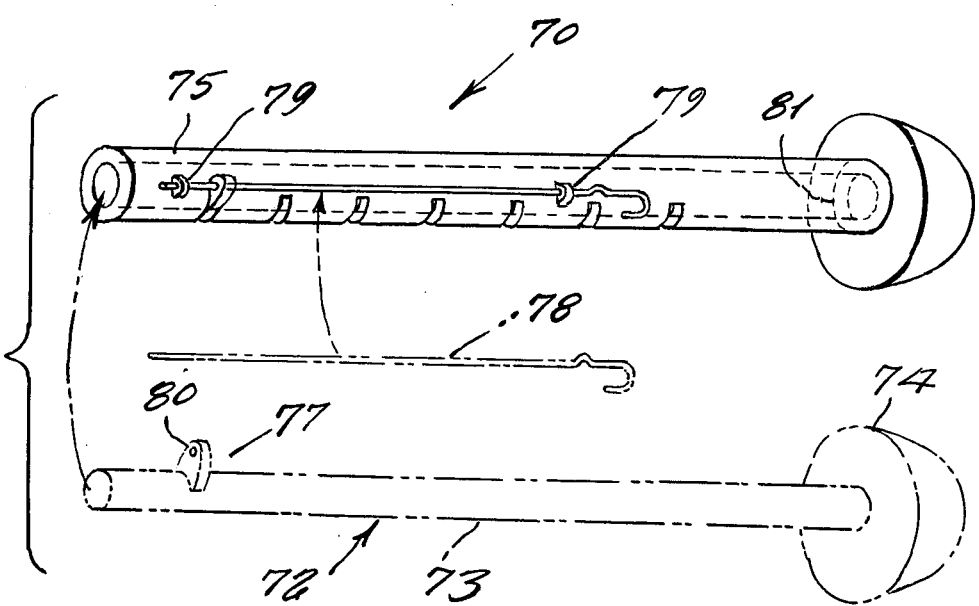
FIG. 7 is a perspective view of still another design.

In FIG. 7, another design of tasty chum bait 70 includes a bait dispenser 71 for dispensing solid, liquid or semi-solid bait. It includes a plunger 72 comprised of a rod 73 integral at its one end with a knob 74, and it additionally includes a tube 75 in which the plunger is slided. The tube has a row of transverse notches 76 interconnected by a long slot, so to selectively receive a lug 77 on a side of the rod. A pin 78 supported in lugs 79 on an outer side of the tube is also inserted through a hole 80 of the lug 77 for retaining the same in selected position. A gasket 81 snuggly fits between the rod and tube. The pin 78 also serves for picking out cotton from the inside of the tube when being cleaned.

While various changes may be made in the detail construction, it is understood that such changes will be within the spirit and scope of the present invention as in defined by the appended claims.

What is claimed is:

1. A fishing lure resembling a fish comprising a fish head and a hollow body, with a tail including a duct through the head communicating with the interior of said body including a rear duct from said body, said body containing material emitting the odor and taste of fish, whereby water entering the body mixes with said material and is emitted therefrom to attract fish, said tail having means for attachment to a fishing line in combination with a second means for causing flow from said rear duct responsive to the fishing line being pulled, whereby said second means opposes resiliently the pull on the fishing line and returns to a normal condition when there is no pull on the line, including a normally closed check valve disposed in the first said duct, said second means comprising a bellows with perforations engaging the fishing line to cause contraction of said bellows when the line is pulled said bellows being secured to a rear portion of said body and enclosing said material whereby contraction of said bellows causes material in said bellows to flow out of said bellows, releasing the pull on the fishing line causing expansion of said bellows to expel a mixture of said material and water through said outlet.

* * * * *